PROCESS FOR TREATING SUBSTRATES IN ORDER TO REDUCE THE MAGNETIC ANGULAR DISPERSION OF THIN FERROMAGNETIC FILMS DEPOSITED ON SUCH SUBSTRATES

Filed June 9, 1970

3,788,897

PROCESS FOR TREATING SUBSTRATES IN ORDER TO REDUCE THE MAGNETIC ANGULAR DISPERSION OF THIN FERROMAGNETIC FILMS DEPOSITED ON SUCH SUBSTRATES

Rene Fernand Victor Girard and Marie-Claire Gidon, Grenoble, France, assignors to Societe Industrielle Bull-General Electric (Societe Anonyme), Paris, France Filed June 9, 1970, Ser. No. 44,707
Claims priority, application France, June 11, 1969, 6919286
Int. Cl. H01f *10/00*
U.S. Cl. 117—236 4 Claims

ABSTRACT OF THE DISCLOSURE

A process for treating the substrate of a thin magnetic film to obtain a surface state which reduces the magnetic angular dispersion of the film, wherein, prior to being coated with the magnetic film, the substrate is immersed in an aqueous solution of palladium chloride and dissolved hydrogen chloride gas.

BACKGROUND OF THE INVENTION

The present invention concerns a treatment for substrates of thin ferromagnetic films which present a uniaxial magnetic anisotropy, with the object of reducing the magnetic angular dispersion of films deposited on such substrates.

The ability of utilize thin ferromagnetic films for realizing fast memories, or large capacity and of reduced size, results from the fact that these films are capable of assuming different magnetic states and, upon being subjected to a reversal of magnetization, of transferring from one state to another in a very short time, of the order of a few nanoseconds. These films are generally obtained by depositing a ferromagnetic material on a substrate, by electrolytic means or by evaporation under vacuum. This deposit is made in the presence of an orienting magnetic field for realizing a uniaxial anisotropy of magnetization; i.e., a direction, termed the easy axis, along which the magnetization of the film is preferentially oriented, this direction subsisting even when, at the conclusion of the deposition process, the orienting magnetic field is removed.

There exists, at the present time, different types of thin film magnetic memories. Thus, memories are known in which each memory plane is formed of two sets of excitation conductors, namely, a set of parallel conductors called "word" conductors and a set of parallel conductors called "digit" conductors orthogonal to the first set, and of a predetermined number of flat magnetic film elements disposed at the crossover points of the conductors. These film elements are disposed on a substrate in such a manner that the easy axes are oriented parallel to the word conductors.

In another mode of realization, each memory plane is constituted of a set of word conductors and of a set of digit conductors disposed perpendicularly to the word conductors, each digit conductor, in the form of a rod or of a wire, being covered, at least in the neighborhood of the crossover points with the word conductors, with a thin film of ferromagnetic material. Such film presents a circumferential anisotropy; i.e., its direction of easy magnetization is circular.

In the instance where each of the digit wire conductors is covered with a continuous magnetic film in which the direction of easy magnetization is circumferential, a memory point, or memory cell, is defined by the crossover point of such wire and a word conductor. In each memory point, the magnetization vector occupies, at rest, either one of two stable positions corresponding to the two opposite directions along the easy axis, thereby permitting the representation of the binary values "1" and "0." For changing the direction of magnetization in a memory point; i.e., for changing the information contained in such point, it is necessary to apply an external magnetic field. This field is the resultant of two component fields: one field, called the "word" field, which is furnished by the word conductor when energized by a current pulse, this field being, as a consequence, perpendicular to the direction of the easy axis of the film, and another field, called the "digit" field, which is furnished by the digit conductor when energized by a current pulse, this field being perpendicular to the preceding field; i.e., oriented along the easy axis. In practice, the word field is applied first and causes the rotation of the magnetization vector of the film to a direction perpendicular to the easy axis, this direction being called the axis of hard magnetization. Then a current pulse of desired polarity is applied to the digit conductor and causes the magnetization vector to swing away from the hard axis, in order that such vector adapts the desired direction along the easy axis when the word pulse ceases. The polarity of the pulse applied to the digit conductor determines the direction of the magnetization vector along the easy axis; i.e., the binary value of information entered into the memory.

It is known, however, that in accordance with the amplitude, the direction, and the duration of the external magnetic field applied, the rotation is reversible or irreversible; i.e., that the magnetization vector returns or not to its initial state after the disappearance of the applied field. There exists a critical value $H_B$, termed the threshold of rotation, such that when the applied magnetic field exceeds this value and posesses a component along the easy axis opposite to the direction of the magnetization vector, the rotation is irreversible and is effected in accordance with the phenomena called coherent rotation. However, this critical value varies according to the direction of the applied magnetic field. In particular, there exists a critical value $H_K$ of this threshold in the direction of the easy axis such that, when the magnetic field applied is oriented opposite to the direction of the magnetization vector and exceeds this threshold value, a coherent rotation reversal is produced. This critical value $H_K$ is called the anisotropy field. The reversal of the magnetization by coherent rotation is always produced in a very short time, of the order of a few nanoseconds.

Independently of the phenomenon of coherent rotation, the magnetization can also be reversed in accordance with a much slower process, termed magnetic domain wall motion. It is known that in thin magnetic films the domains, or regions of uniform magnetization, may be separated by these walls, or regions of transition of the direction of magnetization, and that these walls may participate in the reversal of the magnetization. If the applied magnetic field exceeds in amplitude and in direction a certain critical value, called the threshold of wall motion, which depends on the direction of the field, the magnetization of the film is totally reversed by the wall motion. The value of this threshold is equivalent to the coercive force $H_C$ and, in films currently employed, it is less than anisotropy field $H_K$. However, for applied magnetic fields which are utilized in practice, and of which the component along the hard axis has an amplitude greater than a critical value, the threshold of wall motion $H_C$ is greater than the threshold of coherent rotation $H_B$. Under these conditions, for values of applied magnetic field which are greater than the threshold of coherent rotation $H_B$, but less than the threshold of wall motion $H_C$, the magnetization of the film is still reversed, but this reversal is now partial and no longer total.

These walls can also be displaced when pulses are applied repetitively a large number of times to the same memory address. Thus, it can happen that under the action of stray fields produced in the hard direction when current pulses are applied to the same word conductor, or further under the resultant action of these stray fields and a field oriented in the easy direction, the magnetization of the neighboring memory points is progressively perturbed, even though the amplitude of each of these fields is insufficient to cause a reversal of the magnetization. There is produced thus a "creeping" of the walls, and this phenomenon can continue until the destruction of the information stored in these memory points. These exists, however, a critical threshold field $H_{BR}$ less than the threshold of coherent rotation $H_B$, below which this phenomenon is not produced. For values of applied magentic fields which are less than this threshold $H_{BR}$, the magentization of the film rotates in reversible manner and the walls are not subjected to any motion. It is possible, under these conditions, to effect the readout of the information stored in a memory point while preventing the total and progressive destruction of the information which is stored in such memory point and in neighboring memory points. For this reason such readout is called non-destructive. The critical threshold $H_{BR}$ is, therefore, termed the threshold of nondestructive readout.

In order that a memory of thin magnetic film can function suitably; i.e., in a reliable and accurate manner, and that it provide further the realization of non-destructive readout operations, it is necessary that the different field thresholds which have been defined be precisely determined. This requires that, in the entire extent of the material constituting the uniaxial magnetic film, the magnetization at rest be uniformly aligned with the direction of the easy axis. In practice, this is not so because the magnetic film is not homogenous, but presents domains of uniform magnetization which differ from one another with respect to the amplitude and orientation of their respective magnetization vectors. The magnetization of the film is accordingly dispersed.

The amplitude of this dispersion can be characterized by considering, on both sides of the easy axis, the angle $\alpha$ which comprises 90% of the magnetization vectors of the magnetic domains. This angle $\alpha$ is called the angle of dispersion. In a uniaxial magnetic film presenting a finite angular dispersion, the easy and hard axes are dispersed over a particular region of the angle of dispersion, on both sides of the central axes. In other words, the family of dispersed hard axes are found in the interior of a sector measured by an angle equal to twice the angle of dispersion; i.e., $2\alpha$. Since, for each of these dispersed hard axes, corresponding very definite values of the different field thresholds $H_B$, $H_C$ and $H_{BR}$ can be assigned, it can be said that there are as many of the relative values of these different thresholds as there are hard axes. Under these conditions, the magnetic properties of the film cannot be further characterized to determine a single value of $H_B$, a single value of $H_C$, and a single value of $H_{BR}$. With such a film, it becomes then practically impossible to realize operations of non-destructive readout. Further, the greater the angular dispersion of the film, the greater the amplitude of the magnetic fields necessary for inducing a reversal of 180° in the magnetization. Consequently, not only do memory devices utilizing such films no longer operate in a reliable and accurate manner, but in addition, it appears that their employment is not very economical, so that they practically no longer present advantages in relation to other memories which utilize known switching elements, such as magnetic cores.

It is known that when the thickness of magnetic films is increased so as to exceed a relatively large value, of the order of 10,000 angstroms, the angular dispersion of the films is found to be substantially reduced. In order to reduce the magnetic angular dispersion in films of which the thickness is less than 2,000 angstroms, it has been proposed in the prior art to dispose a layer of dielectric material between the substrate and the magnetic film. The material of such layer is constituted of borosilicates, of lead borosilicates, of calcium alumina silicate, or of quartz glass. For the same reason, it has been proposed to deposit on the substrate, before it is coated with a magnetic film, a layer of silicon monoxide, SiO. This silicon monoxide layer, immediately after its deposition, is exposed to the air or to another oxidizing atmosphere for modifying its state by oxidation.

However, all of these methods are complex and too critical in application to permit obtaining magnetic films of which the magnetic properties are virtually identical from one sample to another.

It is the object of the present invention to remedy these disadvantages by providing a simple treatment permitting the obtaining, on a thin magnetic film substrate, a surface state such that the film which is subsequently deposited on said substrate presents a substantially reduced magnetic angular dispersion.

The treatment provided according to the instant invention is all the more advantageous because it provides for reducing the angular dispersion of magnetic films of very small thickness; i.e., wherein the thickness is less than 2,000 angstroms.

SUMMARY OF THE INVENTION

The invention comprises, in a process for fabricating a memory element consisting of a copper substrate covered with a thin magnetic film presenting a uniaxial anisotropy and of a thickness less than 2,000 angstroms, a treatment of the substrate for the purpose of coating it with a magnetic film. Such treatment is characterized by the fact that the surface of the substrate intended to receive the film is subjected the action of aqueous solution containing palladium chloride at a concentration equal to a selected value between 3 and 300 milligrams per liter of solution, and hydrogen chloride gas dissolved at the rate of about 20 cubic centimeters per liter of solution. This treatment is effected at ambient temperature and for a predetermined time, which time is inversely proportional to the chosen concentration of palladium chloride, being between about three seconds and five minutes. As a result of the treatment of this invention. the magnetic film which is subsequently deposited on the treated substrate presents a magnetic angular dispersion that is reduced relative to that presented by such a magnetic film if it is deposited on a substrate which has not been subjected to this treatment.

BRIEF DESCRIPTION OF THE DRAWING

The invention will be described with reference to the accompanying drawing, wherein.

DESCRIPTION OF THE PREFERRED EMBODIMENT

Before describing the treatment of the instant invention, to which the substrate is subjected, there will first be described herein the significance of the terms: deviation of the magnetization vector and magnetic angular dispersion. Then there will be presented the fundamental concepts necessary to an understanding of the invention, which relate to the switching mechanism of thin magnetic films.

Figure 1:
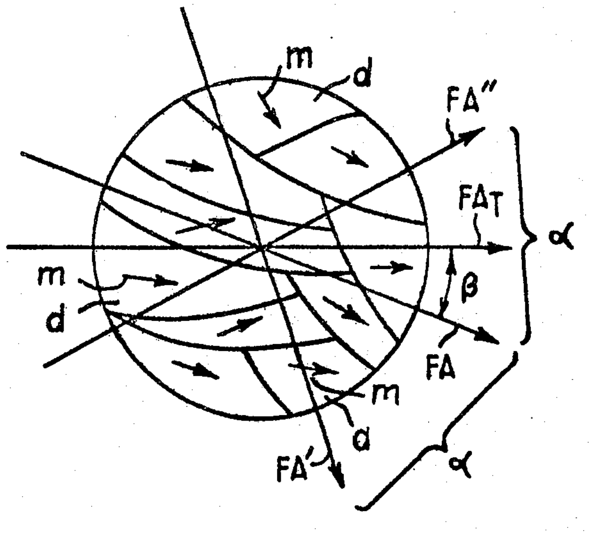
FIG. 1 is a schematic representation, to microscopic scale, of the deviation of the magnetization vector relative to the theoretical direction of the easy axis, shown for the purpose of characterizing the deviation angle and the dispersion angle.

FIG. 1 shows a portion of a thin magnetic film constituted of an aggregate of microscopic magnetic domains *d*. In the interior of each domain the material is magnetized uniformly and to saturation. For each of these domains *d*, there can be associated a magnetization vector *m*. In the ideal case where the magnetization vectors *m* associated with domains *d* are parallel, the resultant obtained from the vector sum of all of these vectors gives the theoretical direction of the easy axis, this direction being indicated by the vector $FA_T$ in FIG. 1. Moreover, this theoretical direction is that of the orienting magnetic field which is applied at the time of the deposit of the ferromagnetic material on the substrate. However, because of diverse interactions which occur during the fabrication, and which result particularly from internal and external strains developed in the course of the deposition and from the state of the surface of the substrate, the magnetization vectors of different magnetic domains are neither parallel to each other nor to the theoretical direction of the easy axis but instead, make different angles with such direction. The resultant obtained from the vector sum of these different magnetization vectors gives then an average direction of the easy axis, or a mean easy axis. The mean easy axis is indicated on FIG. 1 by the vector FA. This mean easy axis FA makes an angle $\beta$ with the theoretical easy axis $FA_T$, the angle $\beta$ being termed the deviation angle of the vector magnetization of the film. There exists, on each side of this mean easy axis FA, an angle $\alpha$, termed the dispersion angle, such that 90% of the angles that the magnetization vectors *m* make with such mean easy axis, are angles equal to or less than $\alpha$. In other words, 90% of the local microscopic vector magnetization is found to be dispersed in the interior of a sector measured by an angle equal to $2\alpha$, this sector being bonded by two vectors FA′ and FA″, disposed on each side of the vector FA and each making an angle $\alpha$ with the vector FA. Under these conditions, the deviation angle $\beta$ can be considered as being the average vector deviation of the local vector deviations of the easy axis.

It is known that in a thin magnetic film presenting uniaxial anisotropy, the magnetization may be changed by the application of an external magnetic field, usually termed the control field. This control field is the result of two component fields: one field, termed the word field, which is furnished by the word conductor upon being energized by a current pulse, this field being perpendicular to the direction of the easy axis of the film, and one field, termed the digit field, which is furnished by the digit conductor upon being energized by a current pulse, this latter field being perpendicular to the former; i.e., oriented along the easy axis. The manner in which the magnetization of the film behaves under the action of this control field may be explained by considering the curves represented in FIG. 2. When the amplitude of the control field applied is very weak, the magnetization of the film swings away from one of its two possible stable positions; i.e., away from the positive direction of the easy axis or away from the negative direction of the easy axis, to align itself along the direction of the control field. After the removal of the control field, the magnetization of the film returns to the position from which it departed. Under these conditions the magnetization of the film varies in a reversible manner. The rotation of the magnetization is always reversible when the end of the vector representing the control field is located in the zone which, in FIG. 2, is denoted by the symbol I.

When the control magnetic field exceeds, in amplitude and in direction, a critical value corresponding to the curve SC which bounds zone I, the magnetization of the film may be totally or partly reversed by the motions of the magnetic domain walls. Thus, the magnetization of the film will be partially or totally reversed if the control field component along the easy axis is oriented in opposite sense to the magnetization of the film along the easy axis, and the end of the vector representative of the control field is located outside of zone I. However, to realize non-destructive readout of the information stored in a memory point, not only is it necessary to utilize a magnetic field of sufficient intensity, oriented in the direction of the hard axis, but the end of the vector representative of such field must be located in zone I. Accordingly, curve SC is called the threshold curve of non-destructive readout.

Figure 2:
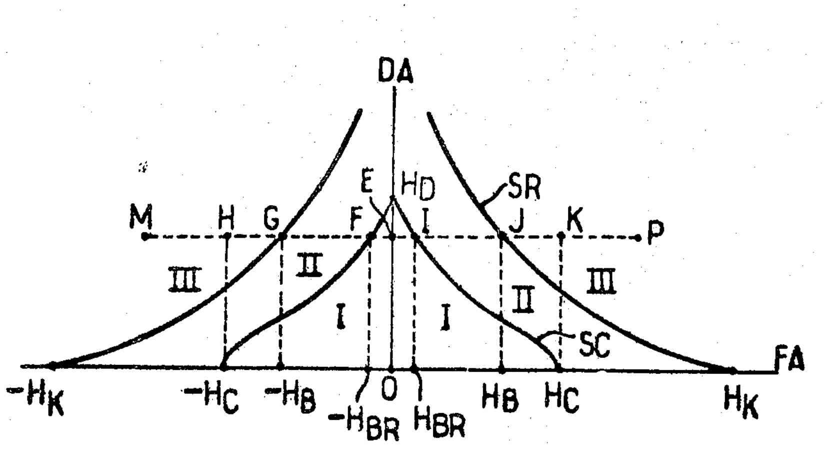
FIG. 2 shows a series of curves illustrating the threshold of rotation at different points and the critical thershold of non-destructive readout in a thin magnetic film presenting neither deviation of the magnetization vector nor magnetic angular dispersion.

In the case where the critical value corresponding to curve SC is exceeded only by a small amount; i.e., when the end of the vector representative of the control field is located in the zone which is denoted by the symbol II in FIG. 2, there is produced a "creeping" of the walls, which leads to the progressive destruction of the information. If, in such zone, the control magnetic field is applied and removed a large number of times, a movement of the walls is observed, this movement being due to the fact that inside the boundaries of a memory point, the magnetic domains which are saturated in a direction opposite to that of the information increase under the repetitive action of the control magnetic field, this growth taking place generally from domains existing at the periphery of the memory point. This phenomena leads, in the limit, to the destruction of the information contained in the memory point.

If the control field component along easy axis is oriented in a direction opposite to that of the magnetization of the film, and the end of the vector representative of this field is located in the zone which, in FIG. 2, is denoted by the symbol III, although the magnetization of the film again turns when the control field is applied from its position along the easy axis to align itself in the direction of this field, such rotation is irreversible and the magnetization of the film is found to be reversed when the control field disappears. Zone III constitute the zone of coherent rotation. It is separated from zone II by a curve SR, which constitutes the threshold of coherent rotation; i.e., the lower limit of the amplitude of the control field for the coherent rotation of the magnetization of the film. For an ideal film; i.e., of uniform magnetization, curve SR is a hypocycloid with four cusps, defined by the equation:

$$H_X^{2/3}+H_Y^{2/3}=H_K^{2/3}$$

where $H_K$ designates the anisotropy field. The two points where this curve meets easy axis FA have for respective abscissas $H_K$ and $-H_K$. These two points define two critical values, along the easy axis, wherein when the magnetic field is oriented along the easy axis in a direction opposite that of the magnetization of the film and has an amplitude greater than the amplitude of a critical value $H_K$, a coherent rotational reversal of the film is produced. However, the magnetization reversal obtained by applying a field of which the component along the easy axis is oriented in a direction opposite to the magnetization and of which the vector representative of its end is located in zone III, may be either a total reversal or a partial reversal. Thus, if such magnetic field exceeds, in amplitude and in direction, a certain critical value termed the threshold of wall motion, which depend on the direction of the field, the magnetization of the film is totally reversed by the displacement of the walls. The value of this threshold is equivalent to the coercive force $H_C$ and, in films presently utilized, is less than the anisotropy field $H_K$.

In order to provide a better understanding of the explanation to follow, there will first be developed, by referring to FIG. 2, the manner in which the magnetization of the film varies when a control field is applied, this field being provided so that the end of the vector which represents the field can explore each of zones I, II, and III by being displaced along a line MP parallel to easy axis FA. The control field necessary for this exploration is obtained by superposing an alternating magnetic field of low frequency, termed the sweep field, directed along easy axis FA, on a magnetic field directed along hard axis DA. The latter field has an amplitude equal to that of the word fields usually employed during the normal operation of the memory, and is produced by current pulses applied to a conductor disposed parallel to the easy axis of the film, consequently playing the role of a word conductor. These pulses are applied at a frequency relatively high compared to the frequency of the sweep field. For studying the variation of the magnetization of the film, it is suitable that the frequency of these pulses be at least $10^4$ times the frequency of the sweep field.

For this study, there can be used advantageously for example, the experimental arrangement which has been described and shown in the French patent application PV N. 6917172, filed May 27, 1969, for "Process for the Treatment of Substrates of Thin Ferromagnetic Films," which corresponds to U.S. patent application S.N. 39,032 filed May 20, 1970, and now U.S. Pat. No. 3,666,641, and assigned to the same assignee as the instant invention. Without supplying all of the construction details of such an arrangement, which provides for studying the magnetic properties of a thin film deposited on a cylindrical conductor of small diameter and presenting a circumferential direction of easy magnetization, the following functional characteristics will be repeated.

The sweep field is produced by alternating current flowing in the conductor at a frequency of 50 Hz. The repetitive field applied in the direction of hard axis DA is attained by excitation of a winding disposed coaxially to such conductor with current pulses produced at the rate of 500,000 pulses per second. The magnetic state of the film is characterized by the amplitude of the signals induced by the rotation of the magnetization of the film when it swings from its position along the easy axis to align itself in the direction of the applied control field. These induced signals are applied to the vertical deflection plates of a cathode ray oscilloscope, the horizontal deflection plates of such oscilloscope being driven by a voltage proportional to the sweep magnetic field. The curve which is displayed, under these conditions, on the screen of the oscilloscope is a cycle termed the Belson cycle, of which the characteristics have been described in the above-mentioned patent application.

Briefly, referring to FIG. 2, assuming that the magnetization of the film is initially oriented along the positive direction of easy axis FA and represents conventionally the binary value "1," such magnetization is not reversed as the end of the vector representative of the control field moves from point P to point E. This movement corresponds a reduction in the amplitude of the sweep field, oriented in the direction of the magnetization of the film, from a maximum value represented by the projection of point P on easy axis FA to the value zero. For this variation of the sweep field, the signals induced by the reversible rotation of the magnetization maintain a substantially constant amplitude, as shown on the curve of FIG. 3, which is the curve observed on the screen of the oscilloscope, by a displacement of the cathode spot from point P′ to point E′, this displacement being theoretically parallel to the easy axis. However, for reasons which have been indicated in the aforementioned patent application, because there is a small progressive variation of the angle through which the magnetization of the film turns, the segment P′E′ is not parallel to the easy axis, but presents a slight inclination relative to such axis, the ordinate of point P′ being somewhat less than that of point E′.

Figure 3:
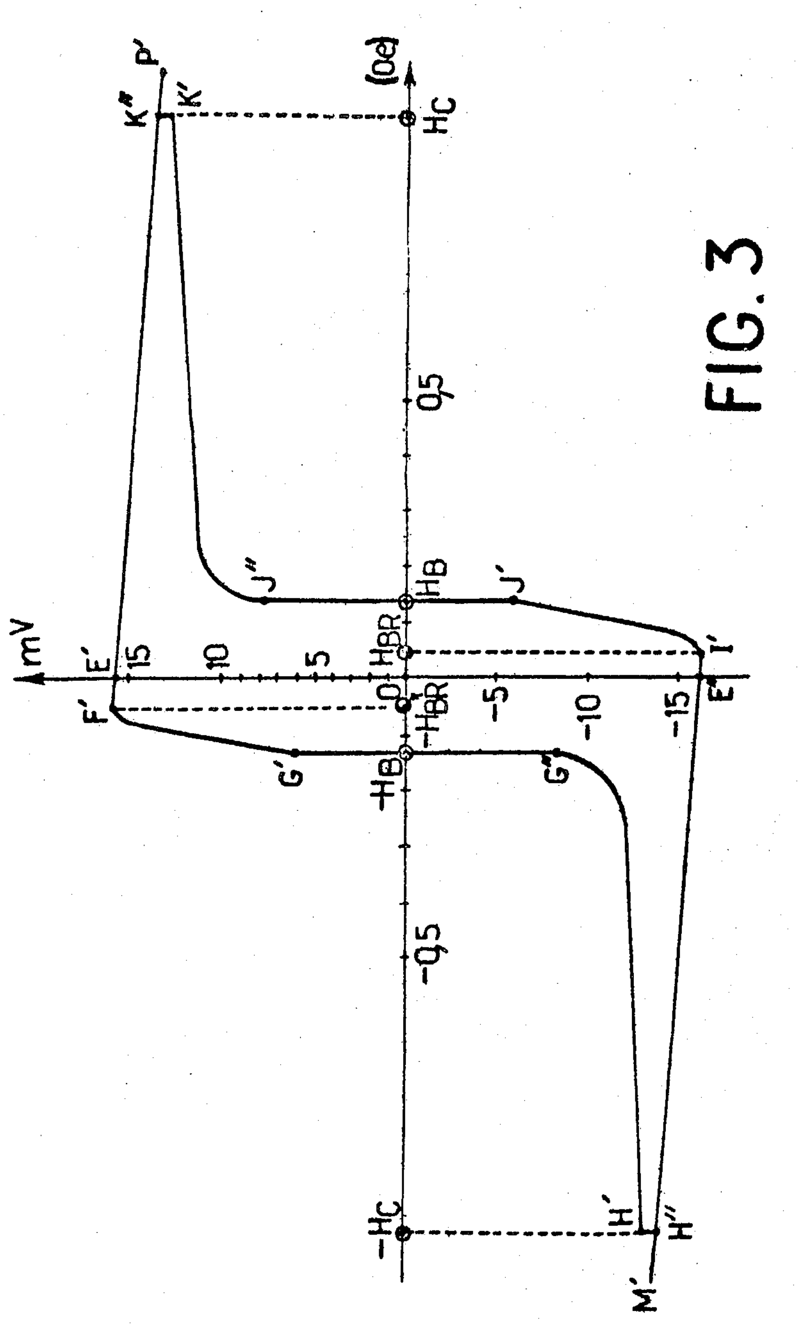
FIG. 3 illustrate a Belson cycle which shows the magnetic behavior of a magnetic film subjected to exploring magnetic fields for the case where such film presents neither deviation of the magnetization vector nor magnetic angular dispersion.

If, now, the sweep field is reversed and increased in amplitude in the negative direction of easy axis FA, the magnetization of the film may vary in a reversible manner or may be partially or totally reversed. As long as the end of the vestor representative of the control field remains in zone I, FIG. 2; i.e., between points E and F, the signals induced by the rotation of the magnetization maintain a constant amplitude, as shown in FIG. 3 by a displacement of the cathode spot from point E′ to point F′, parallel to the easy axis. When, after having passed point F, FIG. 2, of abscissa $-H_{BR}$, the end of the vector representative of the control field enters zone II and moves from point F toward point G, the magnetization of the film is progressively destroyed according to the phenomena of "creeping," whereby the amplitude of the signals induced by the rotation of the magnetization diminish gradually under the repetitive action of the control field, as shown by the segment F′G′ of the cycle of FIG. 3.

When the end of the vector representative of the control field passes point G, FIG. 2, of abscissa $-H_B$, to enter into zone III, the magnetization of the film abruptly reverses, but since a part of this magnetization still varies in reversible manner this reversal is only partial, as shown in FIG. 3 by the trace from point G′ to point G″. As the end of the vector representative of the control field continues its movement toward point M, the number of domains which are oriented in the negative direction of the easy axis increase progressively, such increase being represented by an increase in the amplitude of the induced signals, as shown by the segment G″H′ of the cycle of FIG. 3. When the end of the vector representative of the control field arrives at point H, FIG. 2, of which the projection on the easy axis corresponds to the coercive field of wall motion $-H_C$, the few domains of magnetization which had continued to vary in reversible manner, switch positively to the negative direction of the easy axis, such switching being represented in FIG. 3 by an abrupt jump from point H′ to point H″. After this jump, the signals induced by the rotation of the magnetization maintain a constant amplitude, as shown by the segment H″M′ of FIG. 3, this segment corresponding to the movement from point H to point M, FIG. 2, of the end of the vector representative of the control field. When the end of this vector reaches point M, the sweep field, oriented along the negative directions of axis FA, is of maximum absolute value, such value being represented by the projection of point M on axis FA.

If, now, from its extreme negative value, the amplitude of the sweep field decreases again until it is reduced to zero and then increases in the opposite direction, the magnetization of the film, now oriented along the negative direction of the easy axis and representing the storage of the binary value "0," is not reversed as the end of the vector representative of the control field moves from point M toward point P, FIG. 2, while the remaining between point M and point I, of abscissa $H_{BR}$. Under these conditions, the signals induced by the rotation of the magnetization maintain a substantially constant amplitude, as shown by segment M′I′ of the cycle of FIG. 3. Nevertheless, as can be seen from this figure, such amplitude increases slightly and progressively in proportion to the decrease of the sweep field, because of the progressive variation of the angle through which the magnetization of the film turns. The reasons for such variation have been indicated above in the description and in the previously mentioned patent application.

When the end of the vector representative of the control field describes the segment IJ, FIG. 2; i.e., when it is located in zone II, the magnetization of the film is progressively destroyed according to the phenomenon of "creeping." This progressive destruction is represented by the progressive decrease in the amplitude of the induced signals, as shown by segment I'J' of FIG. 3.

When the end of the vector representative of the control field passes point J, FIG. 2, of abscissa $H_B$, to enter into zone III, the magnetization of the film again reverses abruptly and partially, such reversal being represented by segment J'J" of FIG. 3. This partial reversal is propagated from place to place in the different domains of magnetization of the film as the end of the vector representative of the control field moves from point J toward point K, FIG. 2. In FIG. 3, this progressive reversal of the magnetization is represented by segment J"K' of the cycle. When the end of the control field vector reaches point K, of which the projection on the easy axis corresponds to the coercive field of wall motion $H_c$, the domains which are still oriented in the negative direction of the easy axis switch positively to the opposite direction, such switching being represented in FIG. 3 by the abrupt jump from point K' to point K". After this jump, the signals induced by the rotation of the magnetization maintain a constant amplitude, as shown by the segment K"P' of FIG. 3, this segment corresponding to the movement from point K to point P, FIG. 2, of the end of the vector representative of the control field.

The Belson cycle which has been described is repeated for each cycle of the sweep field. The points characteristic of the Belson cycle are points F' and I', of respective abscissas $-H_{BR}$ and $H_{BR}$, which correspond to the passage from zone I to zone II; i.e., to the two threshold values above which the rotation of the magnetization ceases to be reversible. Other points characteristic of the Belson cycle are points G' and G", of abscissa $-H_B$, and points J' and J", of abscissa $H_B$, these four points corresponding to the passage from zone II to zone III, the values $-H_B$ and $H_B$ being the two threshold values for the coherent rotation of the magnetization. Finally the points H', H", K' and K", which correspond to the thresholds of wall motion, are other points characteristic of the Belson cycle. On the Belson cycle which has been represented in FIG. 3, all of these characteristic points can be determined easily with good approximation, by observing all of the characteristic parts of the cycle. If the oscilloscope has first been carefully calibrated, after the Belson cycle is obtained, the values of the various threshold fields can be determined with relatively high precision.

The particular curves SR and SC, which have been represented in FIG. 2 for explaining how the magnetization of the film behaves when it is subjected to the action of magnetic fields, relate to a film presenting neither deviation of the magnetization vector nor magnetic angular dispersion; i.e., a film for which simultaneously $\beta=0$ and $\alpha=0$. In this instance, FIG. 2, the various points I, J, K, and P are symmetrical, respectively, to points F, G, H and M relative to hard axis DA. Similarly, and as a consequence, the projections of these points on easy axis FA are such that the various thresholds $H_{BR}$, $H_B$ and $H_C$ are symmetrical, respectively, to the thresholds $-H_{BR}$, $-H_B$ and $-H_C$ relative to the point 0 where axes DA and FA meet. On the corresponding Belson cycle, this symmetry is represented by the fact that the center of symmetry of the cycle coincides with the origin of the two coordinate axes, as can be seen from FIG. 3.

Figure 4:
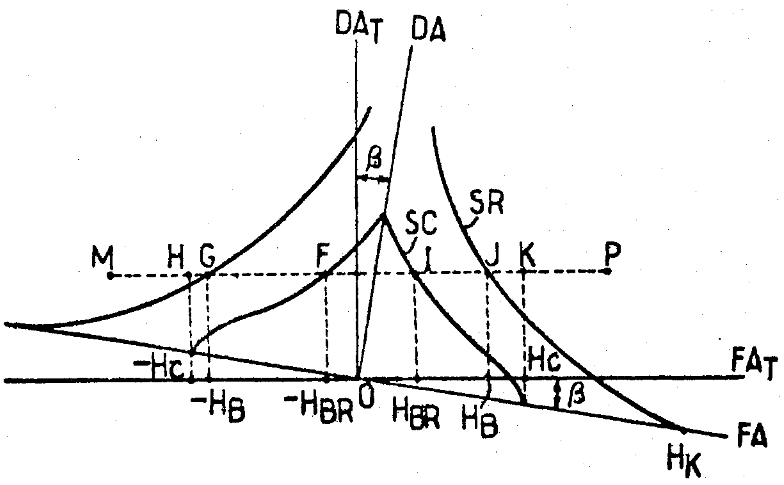
FIG. 4 shows a series of curves illustrating the threshold of rotation at different points and the critical threshold of non-destructive readout in a thin magnetic film presenting a deviation of the magnetization vector, but no magnetic angular dispersion.

In the case where the magnetic film presents a deviation of the magnetization vector characterized by a non-zero value of the angle $\beta$, but presents practically no magnetic angular dispersion, the curves SR and SC, which represent respectively the threshold of coherent rotation and the threshold of non-destructive readout, have the behavior shown in FIG. 4. In FIG. 4 curves SR and SC present, relative to the effective direction of the axes of easy magnetization FA and of hard magnetization DA, the same picture as the corresponding curves of FIG. 2. However, easy axis FA of the film forms an angle $\beta$ with the theoretical easy axis $FA_T$, which is the direction along which the applied magnetic field was oriented at the time of the deposition of the magnetic film on the substrate. Similarly the theoretical hard axis $DA_T$ forms an angle $\beta$, of the same value, with hard axis DA of the film. However, the true directions of easy axis FA and hard axis DA of the film are not known in practice after the deposit of the magnetic film on a substrate, the only axes of which the directions are known being the theoretical easy axis $FA_T$ and the theoretical hard axis $DA_T$.

Consequently, in studying the magnetic behavior of the film, if the same experimental arrangement is utilized as that which has been described in the aforementioned patent application, the sweep field utilized for such study will be oriented along the direction of the theoretical easy axis $FA_T$, and the field created by the winding will be oriented along the direction of the theoretical hard axis $DA_T$. Under these conditions, the end of the vector representative of the control field moves along the line MP parallel to axis $FA_T$. Therefore, FIG. 4, demonstrates that points I and F, of respective abscissas $H_{BR}$ and $-H_{BR}$, which correspond to thresholds of non-destructive readout, are no longer symmetrical relative to hard axis $DA_T$. This absence of symmetry relative to axis $DA_T$ occurs also for points J and G, of respective abscissas $H_B$ and $-H_B$, which correspond to thresholds of coherent rotation, as well as for points K and H, of respective abscissas $H_G$ and $-H_C$, which correspond to thresholds of wall motion.

Figure 5:
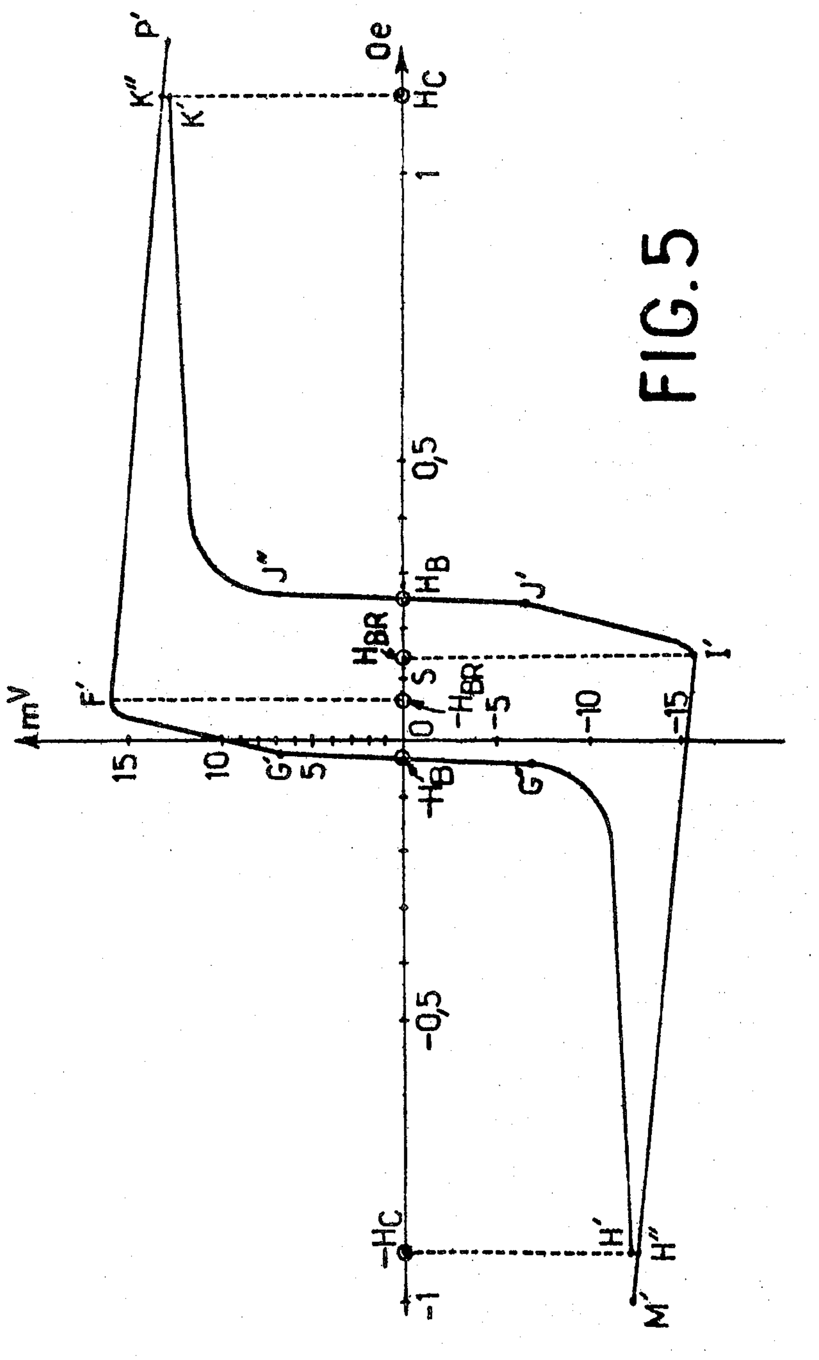
FIG. 5 illustrates a Belson cycle which shows the magnetic behavior of a magnetic film subjected to exploring magnetic fields for the case where such film presents a deviation of the magnetization vector, but no magnetic angular dispersion.

The corresponding Belson cycle shown in FIG. 5 no longer has its center of symmetry at the origin of the two coordinate axes. However, it is possible to determine for the Belson cycle of FIG. 5, a point S representing substantially the center of symmetry of the cycle. Point S is determined to be the middle point of the abscissa portion bounded by the two points, respective abscissas $H_B$ and $-H_B$, where the cycle cuts the abscissa. Relative to this point S, the various thresholds $H_{BR}$, $H_B$, and $H_C$ are respectively symmetrical to the thresholds $-H_{BR}$, $-H_B$, and $-H_C$. These various thresholds can be determined with sufficient precision by observation of the characteristic parts presented by the display of the cycle.

A comparison of the cycle of FIG. 5 with the cycle of FIG. 3 reveals that these two cycles present substantially the same picture, but that the cycle of FIG. 5 differs essentially from that of FIG. 3 in that it is shifted in a direction parallel to the abscissa. Thus, the effect of the deviation of the magnetization vector of the film is manifested particularly by a shifting of the Belson cycle along the abscissa. However, it is not possible from the difference OS (FIG. 5) related to this shift, to determine the value of the angle $\beta$ which characterizes the deviation. The angle $\beta$ is always very small and never exceeds, in practice, a few degrees. However, the larger the angle $\beta$, the greater is the shift of the cycle.

Figure 6:
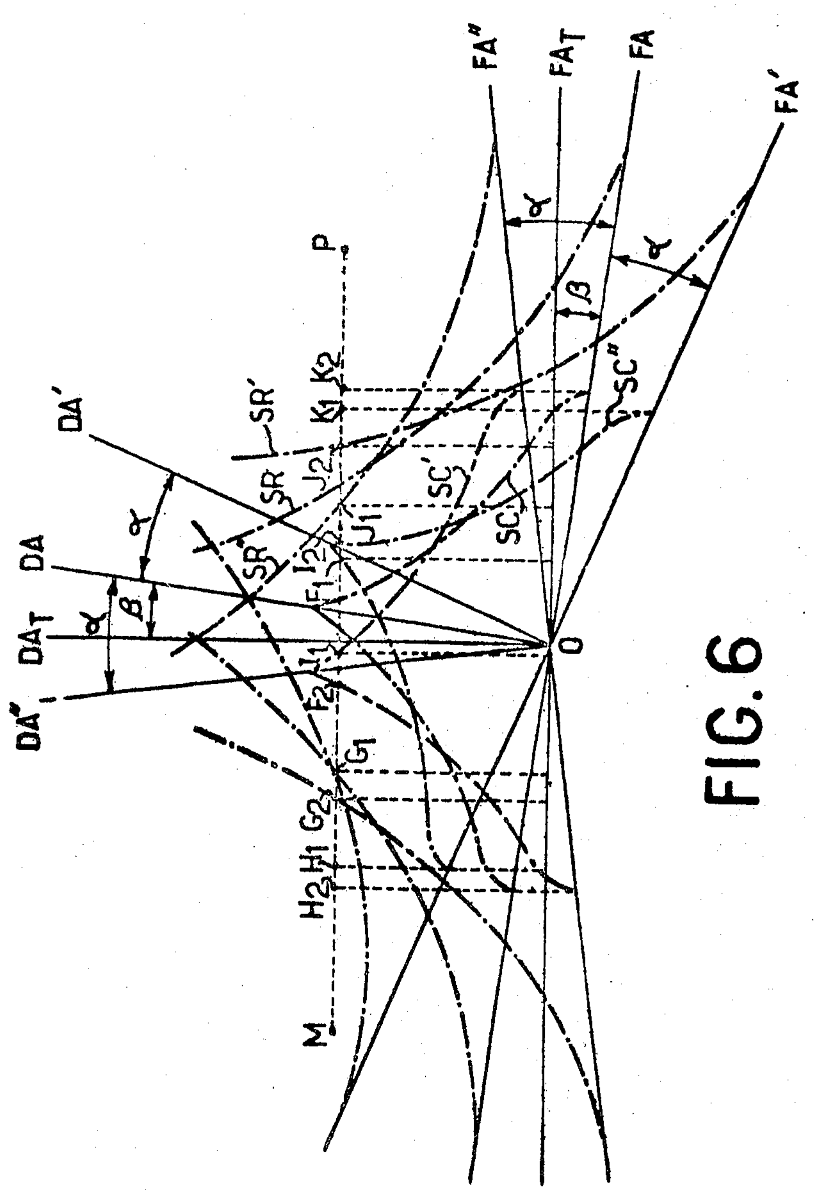
FIG. 6 shows a series of curves illustrating the threshold of rotation at different points and the critical threshold of non-destructive readout in a thin magnetic film presenting both a deviation of the magnetization vector and a magnetic angular dispersion.

In the case where the magnetic film presents both a deviation of the magnetization vector characterized by the angle $\beta$ and a magnetic angular dispersion characterized by the angle $\alpha$, the curves SR and SC of respective thresholds of coherent rotation and non-destructive readout are no longer precisely defined because of the fact that the easy and hard axes are dispersed. As shown in FIG. 6, the family of dispersed easy axes are located within a sector bounded by the two vectors FA' and FA", which are located on each side of the mean easy axis FA and make an angle $\alpha$ with such easy axis. Similarly the family of dispersed hard axes are located within a sector bounded by the two vectors DA′ and DA″, which are located on each side of the mean hard axis DA and make an angle $\alpha$ with such hard axis. Easy axis FA forms an angle $\beta$, with the theoretical easy axis $FA_T$, this latter direction corresponding to the direction of the field applied at the time of the deposition of the magnetic film. Similarly, the mean hard axis forms an angle $\beta$ with the theoretical hard axis $DA_T$, this latter axis being perpendicular to axis $FA_T$. For each of the easy axes of the family of dispersed easy axes, and for the hard axis to which each is perpendicular, correspond a curve SC and a curve SR. Thus, there exists a family of dispersed curves SC and a family of dispersed curves SR. The family of dispersed curves SC is located between two limits represented by a curve SC′, corresponding to axes FA′ and DA′, and a curve SC″, corresponding to axes FA″ and DA″. Similarly the family of dispersed curves SR is located between two limits represented by a curve SR′, corresponding to axes FA′ and DA′, and a curve SR″, corresponding to axes FA″ and DA″.

In studying the magnetic behavior of a film presenting both a deviation and an angular dispersion, if the same experimental arrangement is utilized as described previously, the sweep field produced in such arrangement will be again oriented along the direction of the theoretical easy axis $FA_T$, whereby the end of the vector representative of the control field will move along the line MP parallel to axis $FA_T$. FIG. 6 shows however, that when this vector end moves from point P toward point M, the threshold of non-destructive readout $H_{BR}$, where the vector end passes from zone I to zone II, is no longer precisely defined. Instead, the threshold of non-destructive readout is dispersed along a straight segment limited practically by the points $F_1$ and $F_2$. Further, the threshold of coherent rotation $H_B$, where the end of the vector representative of the control field passes from zone II to zone III, is no longer precisely defined. Instead, the threshold of coherent rotation is also dispersed along a segment bounded practically by the points $G_1$ and $G_2$. Finally, the threshold of wall motion $H_C$ is dispersed along a segment limited practically by points $H_1$ and $H_2$. In an analogous manner, as the end of the vector representative of the control field moves from point M toward point P, there is observed a dispersion of the various threshold fields along respective segments limited, practically, by the points $I_1$, and $I_2$, $J_1$ and $J_2$, and $K_1$ and $K_2$.

Figure 7:
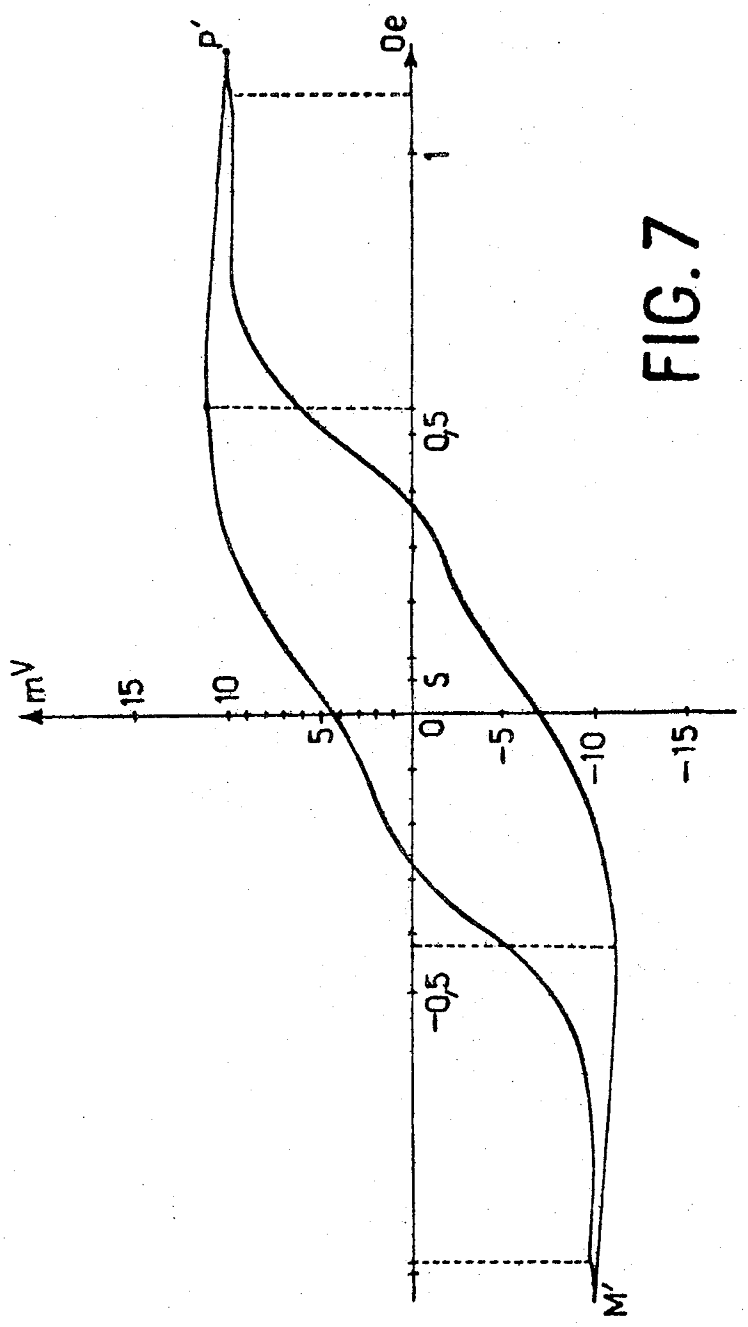
FIG. 7 illustrates a Belson cycle which shows the magnetic behavior of a magnetic film subjected to exploring magnetic fields for the case where such film presents both a deviation of the magnetization vector and a magnetic angular dispersion.

The corresponding Belson cycle is shown in FIG. 7. Inasmuch as the various threshold fields are dispersed, the characteristic points where the amplitudes of the signals experience a relatively abrupt change are no longer found on this cycle. In particular, if there can be everywhere observed on such cycle, from point P, portions wherein the amplitude of the signal is almost constant, the impossibility is apparent of determining the positions, even approximately, of points F′, G′, G″, H′, H″, I′, J′, and J″, K′ and K″, at which, in the cycles of FIGS. 3 and 5, there could be observed changes in the characteristic orientation of the curve representing the variations of amplitude of the induced signals. Under these conditions, it is no longer possible to determine, from the cycle of FIG. 7, the values of the various thresholds $H_{BR}$, $H_B$ and $H_C$. However, it can be determined that the middle point S of the abscissa portion bounded by the two points where the cycle cuts the abscissa does not coincide with the origin of the axes, which denotes the existence of a deviation $\beta$ of the magnetization of the film.

It may be noted that the Belson cycle which is obtained by studying the magnetic behavior of a film deposited without particular care on a copper substrate presents a picture analogous to that of FIG. 7. Such a film does not possess, therefore, well-defined field thresholds and cannot, as a result, be utilized with good reliability. In particular, it is practically impossible to employ such a film for non-destructive readout operations.

As a result of the treatment of the instant invention, these disadvantages are suppressed. This treatment consists of submitting the copper substrate, before it is covered with magnetic material, to the action of an aqueous solution containing palladium chloride, $PdCl_2$, at a predetermined concentration selected from between 3 and 300 milligrams per liter of solution, and hydrogen chloride gas dissolved at the rate of about 20 cubic centimeters of gas per liter of solution. This treatment is effected at the ambient temperature and for a predetermined time, which, according to the concentration of palladium chloride utilized, is between about 5 minutes and 3 seconds. This time of treatment varies according to the concentration of palladium chloride in the solution, and in a manner substantially inversely proportional to such concentration. For example, for a concentration of palladium chloride equal to 3 mg./liter, the time of treatment will be about 5 minutes (300 seconds); for a concentration of $PdCl_2$ equal to 30 mg./liter, the time will be about 30 seconds; and for a concentration of $PdCl_2$ equal to 300 mg./liter, it will be 3 seconds.

When relatively high concentrations of $PdCl_2$ are utilized, of the order of 200 to 300 milligrams per liter, the times of treatment are reduced to a few seconds. However, the greater the concentration of palladium chloride, the less the tolerance on the time of treatment. Thus, for high concentrations of $PdCl_2$, if the required time of treatment is exceeded by a few seconds, a film of palladium is formed on the surface of the substrate of sufficiently significant thickness to modify the magnetic properties of the film later deposited on the substrate. On the contrary, for the same high concentrations of $PdCl_2$, if the treatment is less, by a few seconds, than the necessary time, the substrate is not sufficiently treated, whereupon the angular dispersion of the film subsequently deposited on such substrate is not significantly reduced. Therefore, if it is desired to utilize for treating the substrate, a solution containing a relatively high concentration of palladium chloride, the time of treatment cannot significantly depart from the required value, so that treatment time must be controlled with high precision. If, on the contrary, the support is treated with a low concentration of palladium chloride; i.e., of 3 to 10 milligrams per liter the necessary time of treatment may be less strictly observed. However, since this treatment time exists as a step of relatively significant size, the total time necessary for the fabrication of a memory element will be substantially increased. Because of this, the employment of solutions of low concentration of $PdCl_2$ is not particularly recommended for the rapid and economical production of memory elements.

In the preferred mode of employment of the treatment of the invention, the substrate, which is of copper, is immersed in the aqueous solution of palladium chloride. This substrate is generally constituted of a cylindrical wire of small diameter, but it can, nevertheless, have a different form and be for example, a planar substrate. In the present example, the substrate is constituted, preferably, of a cylindrical wire of beryllium-copper, covered with a layer of copper of some thousands of angstroms of thickness. This wire, of 130 microns diameter, and of very great length, traverses from one end to the other a tank containing an aqueous solution of palladium chloride having a concentration which will be specified later herein. The wire is driven through the tank, by an appropriate driving mechanism, at a constant velocity which, in the example described, is of the order of 10 meters per hour. In the course of its passage through the tank, the wire is completely immersed in the solution. In the instant example, the length of the wire which is immersed is about 8 centimeters, which from the velocity of the wire, provides for treating the wire for about 30 seconds. However, the time of treatment can be adjusted to a different value according to the selected concentration of $PdCl_2$ in the solution, either by driving the wire at a different velocity, or by modifying the dimensions of the tank so as to increase or reduce the length of the immersed wire. In the instant example, where the time of treatment is of the order of 30 seconds, the aqueous solution contained in the tank has the following composition:

| | | |
|---|---|---|
| $PdCl_2$ | mg./liter | 30 |
| HCl | cm.$^3$/liter | 20 |

After having been subjected to this treatment, at the ambient temperature, the wire which emerges from the tank is subjected to a rinsing and then traverses an electrolysis tank containing a bath adapted for depositing on the wire a thin layer of magnetic material. This bath may be constituted, for example, of an aqueous solution of salts of iron and nickel, permitting the deposition on the wire of an alloy of iron and nickel comprising about 18% of iron. However, the magnetic material utilized for covering the wire may be constituted of a magnetic alloy of a different nature. In order to induce a direction of easy magnetization, the deposition of the magnetic material on the wire is effected in the presence of an orienting magnetic field. This field is oriented in a manner that the direction of easy magnetization induced is circular and coaxial to the axis of the wire.

In order to study the magnetic properties of the film deposited on the wire treated in accordance with the invention, the experimental arrangement described in the aforementioned patent application may be used. The Belson cycle which is thereby observed on the screen of the oscilloscope of this arrangement is analogous to that of FIG. 5. If, using this arrangement, there is also studied the properties of a film, of the same alloy and same thickness, deposited on the same wire, but wherein such wire has not been subjected to the treatment of the invention, there is obtained a Belson cycle analogous to that of FIG. 7. If, the two cycles are then compared, it is seen, by referring to the indications which have been denoted previously herein and which permit the ready interpretation of the pictures presented by the cycles, that the treatment of the substrate effected according to the instant invention permits substantially reducing the magnetic angular dispersion of the film which is deposited on this substrate.

Much that has been described in the foregoing and that as represented on the drawing is characteristic of the invention. It is evident that one skilled in the art is able to adduce all modifications of form and of detail using his judgment, without departing from the scope of the invention.

We claim:

1. In a process for fabricating a memory element consisting of a copper substrate having electrolytically deposited thereon a thin magnetic film presenting uniaxial anisotropy with minimum magnetic angular dispersion and of thickness less than 2,000 angstroms, a treatment of said substrate prior to its being coated with said magnetic film, said treatment being characterized in that the substrate surface intended for receiving said film is subjected to the action of an aqueous solution containing palladium chloride at a concentration selected from between 3 and 300 milligrams per liter of solution and hydrogen chloride gas dissolved at the rate of substantially 20 cubic centimeters per liter of solution, said treatment being effected at the ambient temperature and for a duration which is inversely proportional to the selected concentration of palladium chloride and lies substantially between 5 minutes and 3 seconds.

2. The substrate treatment of claim 1, wherein said substrate is completely immersed in said aqueous solution of palladium chloride.

3. The substrate treatment of claim 1, wherein said substrate comprises a continuous cylindrical wire, of small diameter, traversing from one end to the other a tank containing said aqueous solution of palladium chloride, said wire being pulled through said tank at constant velocity and being completely immersed in the course of its passage through said tank.

4. The substrate treatment of claim 3, wherein said wire is pulled through said tank at a constant velocity of 10 meters per hour, and wherein said tank provides for the immersion of a length of said wire of substantially 8 centimeters and contains an aqueous solution having the following composition:

palladium chloride, $PdCl_2$, 30 mg./liter, and said hydrogen chloride gas, HCl, dissolved at the rate of 20 cm.$^3$/liter.

References Cited

UNITED STATES PATENTS

| | | | |
|---|---|---|---|
| 3,350,180 | 10/1967 | Croll | 117—236 X |
| 3,327,297 | 6/1967 | Croll | 117—240 X |
| 3,268,353 | 8/1966 | Melillo | 117—236 |
| 3,138,479 | 6/1964 | Foley | 117—236 |
| 3,392,053 | 7/1968 | Olsen et al. | 117—236 UX |
| 3,098,803 | 7/1963 | Godycki et al. | 117—239 X |
| 3,525,635 | 8/1970 | Haller | 117—239 UX |
| 3,269,854 | 8/1966 | Hel | 117—236 X |
| 3,245,826 | 4/1966 | Luce et al. | 117—236 |
| 3,150,939 | 9/1964 | Wenner | 117—239 X |
| 3,235,473 | 2/1966 | Le Duc | 204—38 X |
| 3,556,954 | 1/1971 | Luborsky | 204—43 T |
| 3,616,290 | 10/1971 | Teledo | 204—43 T |
| 3,467,540 | 9/1969 | Schick | 204—29 |

OTHER REFERENCES

General Chemistry, pp. 285–286, 1963, Nebergall et al.

WILLIAM D. MARTIN, Primary Examiner

B. D. PIANALTO, Assistant Examiner

U.S. Cl. X.R.

117—115, 235, 239, 240; 148—6.31; 204—29, 43